(12) United States Patent
Aue

(10) Patent No.: US 7,913,142 B2
(45) Date of Patent: Mar. 22, 2011

(54) METHOD FOR TESTING AT LEAST ONE ARITHMETIC UNIT INSTALLED IN A CONTROL UNIT

(75) Inventor: Axel Aue, Korntal-Münchingen (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 12/224,735

(22) PCT Filed: Feb. 26, 2007

(86) PCT No.: PCT/EP2007/051802
§ 371 (c)(1),
(2), (4) Date: Jan. 16, 2009

(87) PCT Pub. No.: WO2007/110290
PCT Pub. Date: Oct. 4, 2007

(65) Prior Publication Data
US 2009/0300420 A1     Dec. 3, 2009

(30) Foreign Application Priority Data
Mar. 28, 2006  (DE) .......................... 10 2006 014 267

(51) Int. Cl.
*G01R 31/28* (2006.01)
(52) U.S. Cl. .............. 714/734; 714/25; 714/30; 714/31; 714/715; 714/724; 714/726; 714/727; 714/729; 714/733; 714/736; 714/742
(58) Field of Classification Search .................. None
See application file for complete search history.

(56) References Cited

U.S. PATENT DOCUMENTS

| 6,243,665 | B1 * | 6/2001 | Nagoya et al. .................. 703/20 |
| 6,760,874 | B2 * | 7/2004 | Cote et al. ..................... 714/724 |
| 6,983,398 | B2 * | 1/2006 | Prabhu ............................ 714/12 |
| 2007/0043488 | A1 * | 2/2007 | Avery et al. ..................... 701/33 |

FOREIGN PATENT DOCUMENTS
EP    0 548 585    6/1993

OTHER PUBLICATIONS

Messmer, H.P.: "The Indispensable PC Hardware Book, Second Edition" 1995, Addison-Wesley Publishing Comp., Wokingham, UK, pp. 211, 220, 259-266, 347; and 534-535.

* cited by examiner

*Primary Examiner* — John P Trimmings
(74) *Attorney, Agent, or Firm* — Kenyon & Kenyon LLP

(57) ABSTRACT

A method for testing at least two arithmetic units installed in a control unit includes: loading of first test data for testing a first arithmetic unit; saving the loaded first test data in a second memory unit of a second arithmetic unit; switching the first arithmetic unit to a test mode, in which a first scan chain of the first arithmetic unit is accessible; reading the first test data from the second memory unit; shifting the first test data which have been read through the first scan chain of the first arithmetic unit switched to the test mode for providing test result data for the first arithmetic unit; checking the provided test result data for plausibility for providing a test result for the first arithmetic unit.

10 Claims, 2 Drawing Sheets

METHOD FOR TESTING AT LEAST ONE ARITHMETIC UNIT INSTALLED IN A CONTROL UNIT

BACKGROUND OF THE INVENTION

1. Field of the Invention

The present invention relates to a method for testing at least one arithmetic unit of a control unit installed in a motor vehicle.

2. Description of Related Art

The technical area of the present invention relates to testing integrated circuits, in particular their arithmetic unit or arithmetic units. In the following, computation unit, arithmetic unit, computing device and digital core are used interchangeably and designate the same thing.

Testing integrated circuits or their arithmetic units in an uninstalled state is known. Uninstalled state here means that the integrated circuit, i.e., the arithmetic unit or the arithmetic units, are not, in particular not yet, installed or mounted in a control unit, a control device or the like. This test is performed in particular by the semiconductor manufacturer of the integrated circuit. Examples of such tests include stuck-at tests and path delay tests. With the aid of the stuck-at test, a potential short-circuit of a signal is tested by the supply voltage or ground, for example, in a scan chain or a scan path of the corresponding arithmetic unit. The path delay test tests the propagation times of the signals, for example, via the scan chains or scan paths. Detailed descriptions of the stuck-at test and the path delay test are known from published European patent document EP 0548585.

BRIEF SUMMARY OF THE INVENTION

The method according to the present invention for testing a computation unit installed in at least one control unit, has the advantage compared to the known approaches that arithmetic units may be tested in an installed or mounted state and, in particular, even in the closed control unit. It is thus possible, according to the present invention, to test an arithmetic unit or a plurality of arithmetic units of a control unit, which is/are installed at an arbitrary location of a motor vehicle. In particular, according to the present invention, the stuck-at test and the path delay test may be performed with the control unit installed.

The method according to the present invention thus ensures that the control unit and, in particular, its arithmetic units may be tested after stress or after use in the same way (and thus with a relatively similar test coverage) as at the place of the corresponding semiconductor manufacturer. In particular, an improved analyzability results therefrom in the case of field returns. In particular, the likelihood that a certain error, which could be found by the semiconductor manufacturer in the uninstalled state, is not found in the installed state is increased.

The present invention is based essentially on the idea of providing a method having the following steps for testing at least one arithmetic unit installed in a control unit, the control unit having a control unit interface, at least two arithmetic units, each of which has a scan chain (or the beginning of a circuit connecting the internal scan chains) and at least one memory unit:

loading of first test data with the aid of the control unit interface for testing a first arithmetic unit;
saving the loaded first test data in a second memory unit of a second arithmetic unit;
switching the first arithmetic unit to a test mode, in which a first scan chain of the first arithmetic unit is accessible, with the aid of the second arithmetic unit;
reading the first test data from the second memory unit with the aid of the second arithmetic unit;
shifting the first test data that have been read through the first scan chain of the first arithmetic unit switched to the test mode, with the aid of the second arithmetic unit for providing test result data for the first arithmetic unit;
checking the provided test result data for plausibility with the aid of the second arithmetic unit for providing a test result for the first arithmetic unit.

According to a refinement of the present invention, the test data that have been read from the second memory unit are shifted, with the aid of the second arithmetic unit, through the first scan chain via a first dedicated interface with the aid of which the second arithmetic unit is coupled to the first scan chain.

According to another refinement, the method according to the present invention furthermore has the following steps:

loading of second test data for testing the second arithmetic unit, the second test data being loaded with the aid of the control unit interface, or the first test data stored in the second memory unit being loaded as second test data via an internal interface of the control unit;
saving the loaded second test data in a first memory unit of the first arithmetic unit;
switching the second arithmetic unit to a test mode in which a second scan chain of the second arithmetic unit is accessible with the aid of the first arithmetic unit;
reading the second test data from the first memory unit with the aid of the first arithmetic unit;
shifting the second test data that have been read through the second scan chain of the second arithmetic unit switched to the test mode, with the aid of the first arithmetic unit for providing test result data for the second arithmetic unit; and
checking the provided test result data for plausibility with the aid of the first arithmetic unit for providing a test result for the second arithmetic unit.

According to another refinement, the second test data that have been read from the first memory unit are shifted, with the aid of the first arithmetic unit, through the second scan chain via a second dedicated interface with the aid of which the first arithmetic unit is coupled to the second scan chain.

According to another refinement, the control unit is provided with a clock generator for providing a predefinable clock pulse and the shift of the particular test data that have been read through the particular scan chain is performed using the clock pulse provided for performing a path delay test.

According to an example embodiment of the present invention, the first dedicated interface and/or the second dedicated interface are/is designed as a shift register or an ASC interface or an SPI interface.

According to another embodiment, the control unit interface is designed as a CAN bus or a FlexRay bus or a K Line bus.

According to another embodiment, the particular provided test result data and/or the particular provided test results are saved in at least one memory unit of the first arithmetic unit or the second arithmetic unit and/or is/are provided for export with the aid of the control unit interface.

According to another embodiments the clock pulse of the clock generator is set via the control unit interface.

According to another refinement, the first arithmetic unit and the second arithmetic unit are integrated into a single integrated circuit, the stuck-at paths of the integrated circuit which do not belong to the first arithmetic unit or the second arithmetic unit being tested with the aid of the first arithmetic unit or the second arithmetic unit.

DETAILED DESCRIPTION OF THE INVENTION

Figure 1:
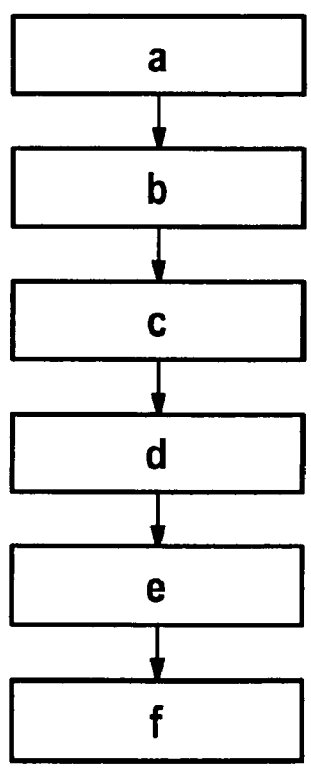
FIG. 1 shows a schematic flow chart of a first exemplary embodiment of the method according to the present invention.

In the figures, the same reference numerals identify the same components or components having an identical function.

FIG. 1 shows a schematic flow chart of a first exemplary embodiment of the method according to the present invention.

The method according to the present invention for testing at least one microcontroller installed in a control unit, having arithmetic units 2, 3, has method steps a) through f) listed below. The control unit has a control unit interface, at least two arithmetic units 2, 3, each of which has a scan chain 4, 5, or an area of a scan chain 4, 5, and at least one memory unit 6, 7.

Method Step a:
First test data are loaded with the aid of the control unit interface for testing a first arithmetic unit 2. The control unit interface is preferably designed as a CAN bus or a FlexRay bus or a K line bus. The test data represent in particular modeled test vectors which are generated or modeled by the semiconductor manufacturer during the circuit synthesis of the corresponding arithmetic unit. The test data are preferably provided by the semiconductor manufacturer as a so-called scan pattern.

Method Step b:
The first test data are stored, i.e., saved, in a second memory unit 7 of a second arithmetic unit 3.

Method Step c:
First arithmetic unit 2 is switched to a test mode with the aid of second arithmetic unit 3. In the test mode, a first scan chain 4 or an area of first scan chain 4 of first arithmetic unit 2 is accessible, i.e., first scan chain 4 may be accessed with the aid of second arithmetic unit 3.

Method Step d:
The first test data are read from second memory unit 7 with the aid of second arithmetic unit 3.

Method Step e:
The first test data which have been read are shifted through first scan chain 4 of first arithmetic unit 2 switched to the test mode, with the aid of second arithmetic unit 3, for providing test result data for arithmetic unit 2. The first test data that have been read from second memory unit 7 with the aid of second arithmetic unit 3 are preferably shifted, through first scan chain 4 via a first dedicated interface 8, with the aid of which second arithmetic unit 3 is coupled to first scan chain 4. In particular, first dedicated interface 8 is designed as a shift register or an ASC interface or an SPI interface.

Method Step f:
The provided test result data are checked for plausibility with the aid of second arithmetic unit 3 for providing a test result for first arithmetic unit 2. In particular, the provided test result data are compared to test result data to be expected. The test result reveals in particular whether an error and, in particular, a stuck-at error exists for first scan chain 4. The provided test result data and/or the provided test result for first arithmetic unit 2 are/is preferably saved in a memory unit, in particular in second memory unit 7. Alternatively, the provided test result data and/or the provided test result for first arithmetic unit 2 may also be provided by an arbitrary analyzer device via the control unit interface for export.

Figure 2:
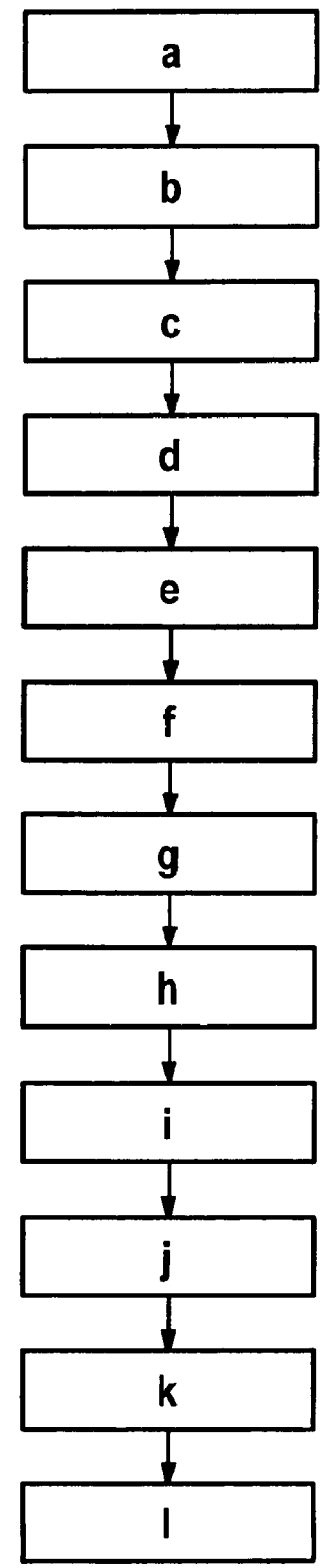
FIG. 2 shows a schematic flow chart of a second exemplary embodiment of the method according to the present invention.

FIG. 2 shows a schematic flow chart of a second exemplary embodiment of the method according to the present invention. The second exemplary embodiment according to FIG. 2 has method steps a) through f) of the first exemplary embodiment according to FIG. 1 and method steps g) through l) below. The second exemplary embodiment according to FIG. 2 provides a test method in which first arithmetic unit 2 is tested with the aid of second arithmetic unit 3 and second arithmetic unit 3 is tested with the aid of first arithmetic unit 2.

Method steps a) through f) of FIG. 2 correspond to method steps a) through f) of FIG. 1. The second exemplary embodiment according to FIG. 2, starting with method step g), follows method step f) of the first exemplary embodiment according to FIG. 1.

Method Step g):
Second test data for testing second arithmetic unit 3 are loaded, the second test data being loaded with the aid of the control unit interface, or the first test data stored in second memory unit 7 being loaded as second test data via an internal interface of control unit 1. The internal interface is designed, for example, as a bus system of the control unit.

Method Step h):
The loaded second test data are saved, i.e., stored in a first memory unit 6 of first arithmetic unit 2.

Method Step i):
Second arithmetic unit 3 is switched, with the aid of first arithmetic unit 2, to a test mode in which a second scan chain 5 of second arithmetic unit 3 is accessible. In particular, in the test mode, second arithmetic unit 2 may access second scan chain 5 of second arithmetic unit 3.

Method Step j):
The second test data are read from first memory unit 6 with the aid of the first arithmetic unit 2.

Method Step k):
The second test data that have been read are shifted through second scan chain 5 of second arithmetic unit 3 switched to the test mode, with the aid of first arithmetic unit 2 for providing test result data for second arithmetic unit 5. Second test data which have been read from first memory unit 6 are preferably shifted through second scan chain 5 with the aid of first arithmetic unit 2 via a second dedicated interface 9. Second dedicated interface 9 couples first arithmetic unit 2 to second scan chain 5 and is designed in particular as a shift register or an ASC interface or an SPI interface.

Method Step l):
The provided test result data are checked for plausibility with the aid of first arithmetic unit 2 for providing a test result for second arithmetic unit 3. In the plausibility check, the provided test result data are compared with test result data to be expected which are a function of the second test data. The provided test result data and/or the provided test result for second arithmetic unit 3 are/is preferably saved in at least one memory unit 6, 7 of control unit 1, in particular in first memory unit 6. Alternatively, the provided test result data and/or the provided test result for second arithmetic unit 3 are/is provided with the aid of an arbitrary analyzer device via the control unit interface for export.

Control unit 1 is preferably provided with a clock generator 10 for providing a predefinable clock pulse in both the first exemplary embodiment according to FIG. 1 and in the second exemplary embodiment according to FIG. 2. Consequently, the particular test data that have been read may be shifted through the particular scan chain 4, 5 under clock pulse control. The performance of a path delay test is thus made possible by using the provided clock pulse. In particular, in the path delay test, delay times when shifting through individual units of the particular scan chain or scan path are measured. The clock pulse of clock generator 10 is preferably set via the control unit interface. For this purpose, for example, an analyzer device is coupled to the control unit interface, using which the clock pulse of clock generator 10 is set.

In particular, in both exemplary embodiments of FIGS. 1 and 2, first arithmetic unit 2 and second arithmetic unit 3 are integrated into a single integrated circuit, the stuck-at paths of the integrated circuit which do not belong to first arithmetic unit 2 or second arithmetic unit 3 being tested with the aid of first arithmetic unit 2 or second arithmetic unit 3.

Figure 3:
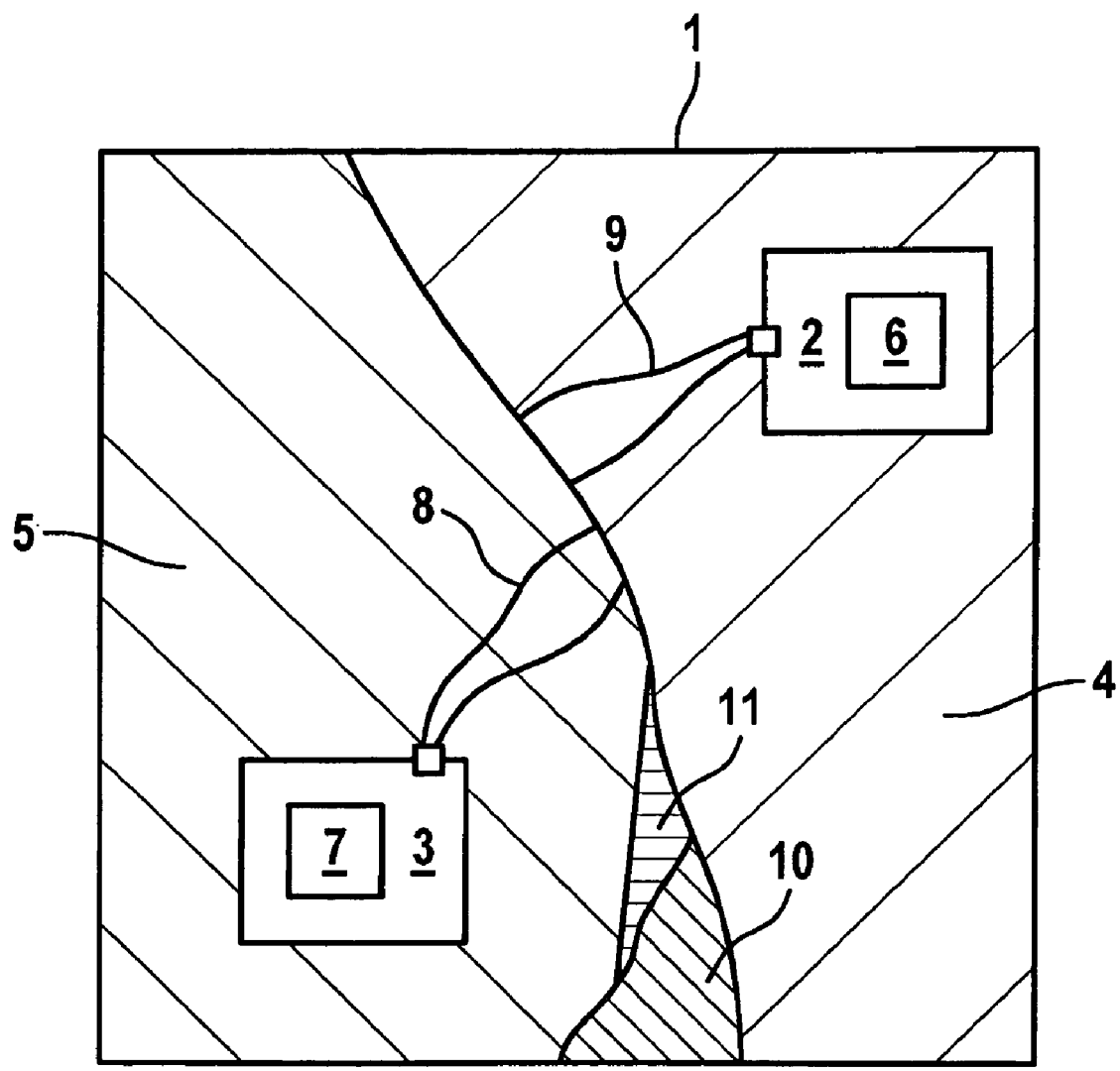
FIG. 3 shows a schematic view of an exemplary embodiment of a control unit which is tested with the aid of the method according to the present invention.

FIG. 3 shows a schematic view of an exemplary embodiment of a microcontroller 1 which is tested with the aid of the method according to the present invention as described previously. Reference numeral 1 identifies, in particular, the silicon surface of the microcontroller. Microcontroller 1 has a first arithmetic unit 2 having a first memory unit 6, and a second arithmetic unit 3 having a second memory unit 7. Furthermore, control unit 1 has a control unit interface (not depicted), a first clock generator 10 and a second clock generator 11. First clock generator 10 delivers, in particular, the clock pulse for performing the path delay test. Second clock generator 11 clocks, for example, first arithmetic unit 2 and/or second arithmetic unit 3. Reference numerals 4 and 5 identify an area of first scan chain 4 on the silicon surface and an area of second scan chain 5 on the silicon surface, respectively. Second arithmetic unit 3 may access the area of first scan chain 4 with the aid of first dedicated interface 8. First arithmetic unit 2 may access the area of second scan chain 5 with the aid of second dedicated interface 9. In particular, dedicated interfaces 8, 9, are each designed as shift registers.

Although the present invention has been described on the basis of preferred exemplary embodiments, it is not limited thereto, but may be modified in multiple ways. Thus, for example, the number of arithmetic units of a control unit to be tested with the aid of the method according to the present invention is not limited to two. Any number of arithmetic units of a control unit is testable with the aid of the method according to the present invention. Another specific embodiment is the location of the test vectors in a shared memory. It is furthermore possible to store the test data not in silicon, but to load both input data and output data via a control unit interface (not shown in the drawings), separate for each arithmetic unit, and retransmit them outward.

What is claimed is:

1. A method for testing at least a first arithmetic unit of a microcontroller of a control unit, the microcontroller having at least the first arithmetic unit and a second arithmetic unit, the control unit having a control unit interface, the first arithmetic unit having a first scan chain and at least a first memory unit, the second arithmetic unit having a second scan chain and at least a second memory unit, the method comprising:

a) loading first test data with the aid of the control unit interface for testing the first arithmetic unit;

b) saving the loaded first test data in the second memory unit of the second arithmetic unit;

c) switching the first arithmetic unit to a test mode in which the first scan chain of the first arithmetic unit is accessible with the aid of the second arithmetic unit;

d) reading the first test data from the second memory unit with the aid of the second arithmetic unit;

e) shifting the first test data which have been read through the first scan chain of the first arithmetic unit switched to the test mode, with the aid of the second arithmetic unit, for providing test result data for the first arithmetic unit; and f) checking the provided test result data for plausibility with the aid of the second arithmetic unit for providing a test result for the first arithmetic unit.

2. The method as recited in claim 1, wherein the first test data which have been read from the second memory unit are shifted, with the aid of the second arithmetic unit, through the first scan chain via a first dedicated interface, and wherein the second arithmetic unit is coupled to the first scan chain with the aid of the first dedicated interface.

3. The method as recited in claim 2, wherein the first dedicated interface is configured as one of a shift register, an ASC interface, or an SPI interface.

4. The method as recited in claim 2, wherein the control unit interface is configured as one of a CAN bus, a FlexRay bus, a K-Line bus, or a LIN bus.

5. The method as recited in claim 2, wherein the first arithmetic unit and the second arithmetic unit are integrated into a single integrated circuit, and wherein stuck-at paths of the integrated circuit which do not belong to one of the first arithmetic unit or the second arithmetic unit are tested with the aid of one of the first arithmetic unit or the second arithmetic unit.

6. The method as recited in claim 1, further comprising:

g) loading second test data for testing the second arithmetic unit, the second test data being loaded with the aid of the control unit interface;

h) saving the loaded second test data in the first memory unit of the first arithmetic unit;

i) switching the second arithmetic unit to a test mode in which the second scan chain of the second arithmetic unit is accessible with the aid of the first arithmetic unit;

j) reading the second test data from the first memory unit with the aid of the first arithmetic unit;

k) shifting the second test data which have been read through the second scan chain of the second arithmetic unit switched to the test mode, with the aid of the first arithmetic unit, for providing test result data for the second arithmetic unit; and l) checking the provided test result data for plausibility with the aid of the first arithmetic unit for providing a test result for the second arithmetic unit.

7. The method as recited in claim 6, wherein the second test data which have been read from the first memory unit are shifted, with the aid of the first arithmetic unit, through the second scan chain via a second dedicated interface, and wherein the first arithmetic unit is coupled to the second scan chain with the aid of the second dedicated interface.

8. The method as recited in claim 1, wherein the control unit is provided with a clock generator configured to provide a predefinable clock pulse, and wherein the shifting of the first test data that have been read through the first scan chain is performed using the clock pulse provided for performing a path delay test.

9. The method as recited in claim 8, wherein the clock pulse of the clock generator is set via the control unit interface.

10. The method as recited in claim 1, wherein at least one of the provided test result data and the provided test result for the first arithmetic unit is at least one of saved in the second memory unit of the second arithmetic unit and provided for export with the aid of the control unit interface.

* * * * *